(12) United States Patent
Kawai et al.

(10) Patent No.: US 7,382,441 B2
(45) Date of Patent: Jun. 3, 2008

(54) OBJECT DETECTING APPARATUS HAVING LIGHT RADIATION POWER REGULATING FUNCTION

(75) Inventors: Nobuharu Kawai, Okazaki (JP); Yoshiaki Hoashi, Kariya (JP)

(73) Assignee: DENSO Corporation, Kariya (JP)

( * ) Notice: Subject to any disclaimer, the term of this patent is extended or adjusted under 35 U.S.C. 154(b) by 125 days.

(21) Appl. No.: 11/075,182

(22) Filed: Mar. 8, 2005

(65) Prior Publication Data

US 2005/0200832 A1    Sep. 15, 2005

(30) Foreign Application Priority Data

Mar. 9, 2004  (JP) .............................. 2004-065926

(51) Int. Cl.
*G01C 3/08* (2006.01)
(52) U.S. Cl. .................... 356/4.01; 356/4.07; 356/5.01; 356/5.03
(58) Field of Classification Search ............... 356/3–22
See application file for complete search history.

(56) References Cited

U.S. PATENT DOCUMENTS

| | | | | |
|---|---|---|---|---|
| 4,498,764 A | * | 2/1985 | Bolkow et al. | 356/5.06 |
| 4,593,409 A | * | 6/1986 | Miller | 455/73 |
| 5,589,928 A | * | 12/1996 | Babbitt et al. | 356/4.1 |
| 6,031,601 A | * | 2/2000 | McCusker et al. | 356/5.01 |
| 6,304,356 B1 | * | 10/2001 | Dubos et al. | 398/197 |
| 7,027,641 B2 | * | 4/2006 | Ide et al. | 382/154 |
| 2003/0169046 A1 | * | 9/2003 | Morris | 324/409 |

FOREIGN PATENT DOCUMENTS

| | | |
|---|---|---|
| JP | 09-243729 | 9/1997 |
| JP | 10239432 | 9/1998 |
| JP | 2002-031685 | 1/2002 |

OTHER PUBLICATIONS

Chinese Office Action issued in the corresponding Chinese Patent Application No. 200510054122.X, and English translation thereof. Chinese Examination in corresponding application.

* cited by examiner

*Primary Examiner*—Thomas H. Tarcza
*Assistant Examiner*—Timothy A Brainard
(74) *Attorney, Agent, or Firm*—Harness, Dickey & Pierce, PLC

(57) ABSTRACT

An object detecting apparatus for a vehicle has a light radiation unit and a light receiver unit disposed in a case for detecting an object or a distance to the object. When a vehicle is at a stop, the apparatus detects an output power of a laser light radiated from the light radiation unit by the light receiving unit and feedback-controls the output power of the laser light to a predetermined level based on the detected output power of the laser light. The feedback control is effected by an amplifier circuit, a pulse width detector circuit and a current regulator circuit. Thus, the output power of the laser light is reduced not to damage human eyes when the vehicle is at a stop.

6 Claims, 2 Drawing Sheets

OBJECT DETECTING APPARATUS HAVING LIGHT RADIATION POWER REGULATING FUNCTION

CROSS REFERENCE TO RELATED APPLICATION

This application is based on and incorporates herein by reference Japanese Patent Application No. 2004-65926 filed on Mar. 9, 2004.

FIELD OF THE INVENTION

The present invention relates to an object detecting apparatus mounted on a vehicle, for instance, for detecting an object such as a preceding vehicle or a distance to such an object by using a laser light.

BACKGROUND OF THE INVENTION

A conventional object detecting apparatus mounted on a vehicle uses a laser light, for instance, to detect a distance to an object such as a preceding vehicle. This detecting apparatus intermittently drives a laser diode to radiate the laser light towards the forward area of the vehicle, and detects the laser light reflected from the forward object by a photo sensor. The detecting apparatus measures the distance to the forward object based on a time difference between a light radiation time and a light reception time.

Specifically, as disclosed in JP 2002-031685A, the detecting apparatus comprises a light radiation unit for radiating a laser light, a polygon mirror and a light receiver unit for receiving a reflected laser light. The polygon mirror is shaped in a frustum of a hexagonal pyramid and rotatable as a scanning mirror.

According to this construction, the polygon mirror reflects the laser light radiated from the light radiation unit and directs it to the forward area of the vehicle. As the polygon mirror is rotated and the laser light from the light radiation unit is directed to each side surface of the polygon mirror, so that the angle of reflection of the laser light at the polygon mirror is adjusted to scan a predetermined range of the forward area of the vehicle by the laser light. The receiver unit includes a Fresnel lens and a light receiving device to receive the laser light reflected from the forward object and measure the distance to the object.

It is required to increase the output power of the laser light to cover a long distance or a wide area. The laser light of increased output power level is not desired so that human eyes may be protected from receiving the laser light.

In the case of a vehicle stop-and-go system which automatically stops and starts a vehicle in correspondence with a stop and start of a preceding vehicle, the output power of the laser light is decreased when the vehicle is at a stop. This is because it is more likely that the human eyes may receive the laser light when the vehicle is at a stop.

For this reason, the output power of the laser light must be controlled precisely. It is however difficult because the current-to-power characteristics of laser diodes vary from diode to diode.

SUMMARY OF THE INVENTION

The object of the present invention is therefore to provide an object detecting apparatus that can control an output power of a laser light with high precision when the output power is decreased.

According to the present invention, an object detecting apparatus for a vehicle has a light radiation unit and a light receiver unit disposed in a case for detecting an object or a distance to the object. When a vehicle is at a stop, the apparatus detects an output power of a laser light radiated from the light radiation unit by the light receiving unit and feedback-controls the output power of the laser light to a predetermined level based on the detected output power of the laser light. The feedback control is preferably effected by an amplifier circuit, a pulse width detector circuit and a current regulator circuit. Thus, the output power of the laser light is reduced not to damage human eyes when the vehicle is at a stop.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
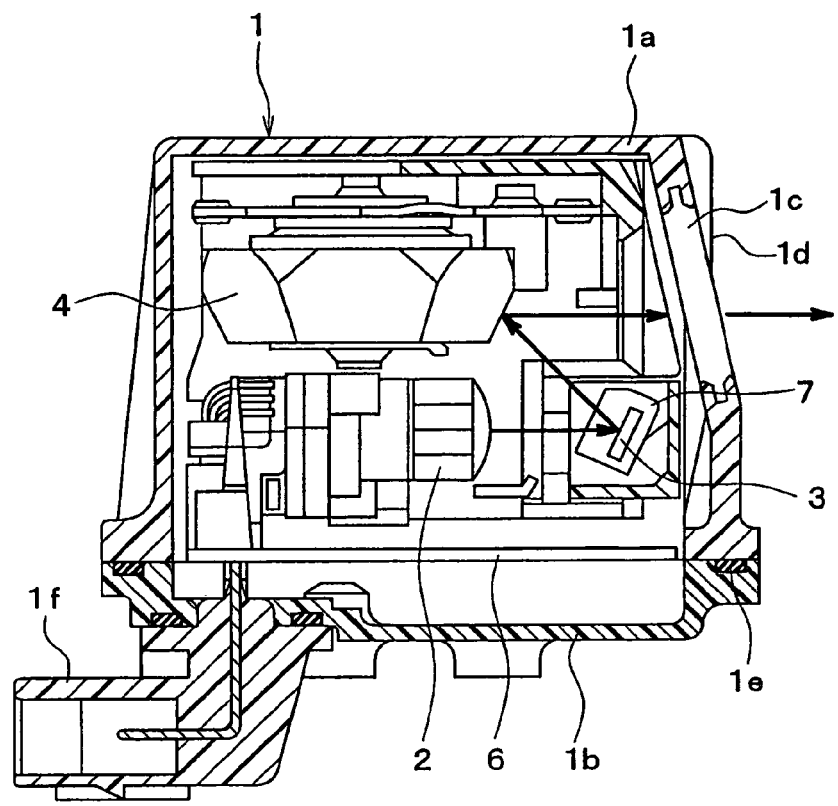
FIG. 1 is a sectional view of an object detecting apparatus according to an embodiment of the present invention.
Figure 2:
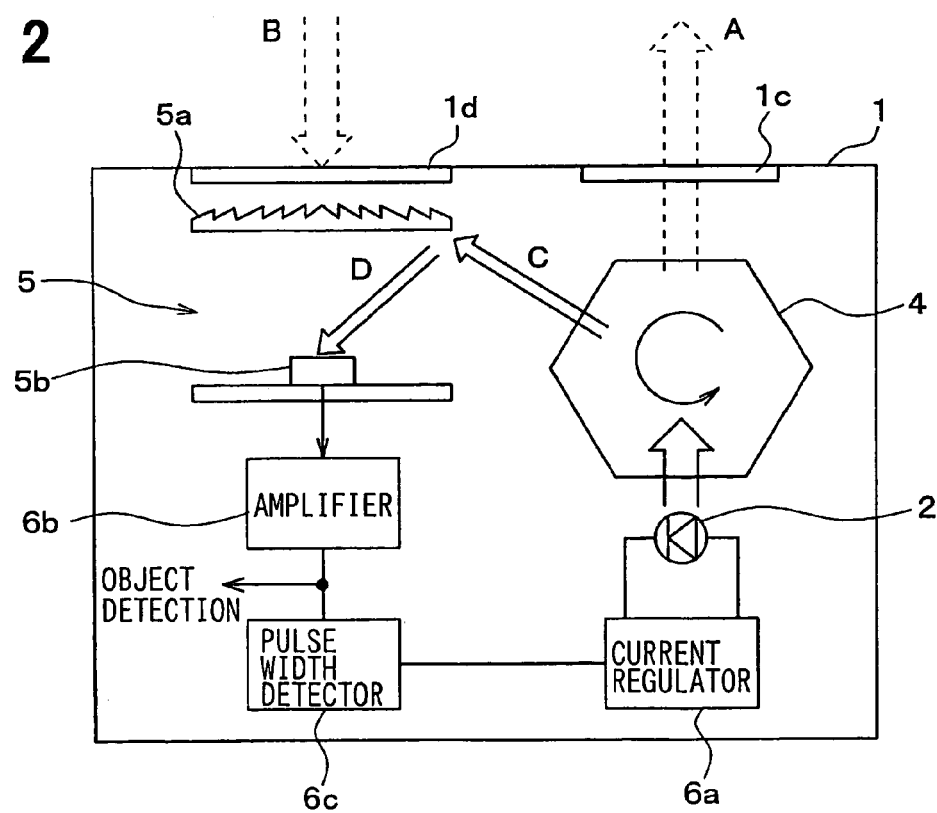
FIG. 2 is a schematic plan view of an arrangement of component parts used in the embodiment.

Referring to FIGS. 1 and 2, an object detecting apparatus includes a case 1 shaped in a cuboid and various component parts accommodated in the case 1. The apparatus is mounted on a vehicle to be used as a laser radar. The apparatus is positioned to radiate a laser light in the forward direction of the vehicle, rightward direction in FIG. 1 and upward direction in FIG. 2, to detect a distance to a forward object such as a preceding vehicle during an auto-cruise control condition.

The case 1 includes a first case 1a and a second case 1b. The first case 1a is box-shaped and open at its one side (bottom side in FIG. 1). The first case 1a accommodates therein various component parts. The first case 1a has a light radiating window 1c and a light receiving window 1d arranged sidewise each other. The windows 1c and 1d may be made of light transmitting resin such as glass and acrylic resin.

The second case 1b is made of a plate-shaped resin. The cases 1a and 1b are fixed to each other with a sealing member 1e therebetween. The second case 1b has an electrical connector 1f made of resin. The connector 1f partly projects from the second case 1b to connect the electrical parts (not shown) provided inside and outside the case 1.

The case 1 (1a and 1b) accommodates a light radiation unit 2, a reflection mirror 3, a polygon mirror 4 and an electric circuit board 6. The circuit board 6 includes an electronic control circuit, which are connected to the light radiation unit 2, a light receiver unit 5 and the like to detect a forward object and measure the distance to the forward object. The light receiver unit 5 is positioned inside the case 1 to face the light receiving window 1d and includes a Fresnel lens 5a and a light receiving device 5b.

The light radiation unit 2 is driven by the control circuit provided on the circuit board 6 and radiates the laser light towards the reflection mirror 3. The light radiation unit 2 may include a laser diode to radiate the laser light in the pulse form.

The reflection mirror 3 reflects the laser light radiated from the radiation unit 3 and directs it to the polygon mirror 4. The reflection mirror 3 is supported swingably to the case 1 by a support part 7 fixed to the inside wall of the case 1. For instance, the reflection mirror 3 may be driven by a motor (not shown) and controlled by the electric circuit of the circuit board 6 to adjust the direction of reflection.

The reflection mirror 3 reflects the laser light toward the polygon mirror 4 or the inner wall of the case 1 depending on its angle of inclination, which is changed between the vehicle running condition and the vehicle stopping condition.

The polygon mirror 4 is shaped in a frustum hexagonal prism and supported by the case 1. The polygon mirror 4 is rotatable about an axis of the hexagonal prism. This mirror 4 is also driven by a motor (not shown) controlled by the control circuit of the circuit board 6. The polygon mirror 4 has reflection mirror surfaces around its entire periphery, each of which operates as a scanning reflection mirror.

Specifically, the polygon mirror 4 reflects the laser light radiated from the radiation unit 2 and reflected by the reflection mirror 3, and directs the laser light toward the vehicle forward area through the radiating window 1c. As the polygon mirror 4 is rotated, the angle of the side face of the polygon mirror 4 changes. As a result, the angle of projection of the laser light is changed to scan a predetermined forward area of the vehicle.

The light receiver unit 5 includes the Fresnel lens 5a and the light receiving device 5b such as a photo diode. The Fresnel lens 5a collects the laser light reflected from the forward object and received through the window 1d. The light receiving device 5b receives the laser light reflected by the forward object and received through the window 1d, or the laser light reflected by the inner wall surface of the case. The light receiving device produces an output voltage or output current varying with the intensity of the received light. The output voltage or current is applied to the control circuit of the circuit board 6.

The light receiver unit 5 is positioned sidewise from the polygon mirror 4. Namely it is displaced from the rotation axis of the polygon mirror 4 in the lateral direction. The circuit board mounts thereon various electric circuits such as a current regulator circuit 6a, an amplifier circuit 6b, a pulse width detector circuit 6c and the like. The output signal of the light receiving device 5b is supplied to an amplifier circuit 6b provided on the circuit board.

The current regulator circuit 6a supplies a pulse-shaped current to the light emitter device 2 for radiation of the laser light from the light emitter device 2. The current regulator circuit 6a also varies the magnitude of the pulse-shaped current thereby to regulate the output power of the laser light. Specifically, the current regulator circuit 6a varies the magnitude of the current in accordance with the detection result of the pulse width detector circuit 6c.

The amplifier circuit 6b amplifies the output signal of the light receiving device 5b and supplies the amplified output signal to the pulse width detector circuit 6c. This amplified signal is also applied to an object detector circuit, which measures a distance to an object such as a preceding vehicle from the difference in time points of radiation and reception of the laser light.

Figure 3:
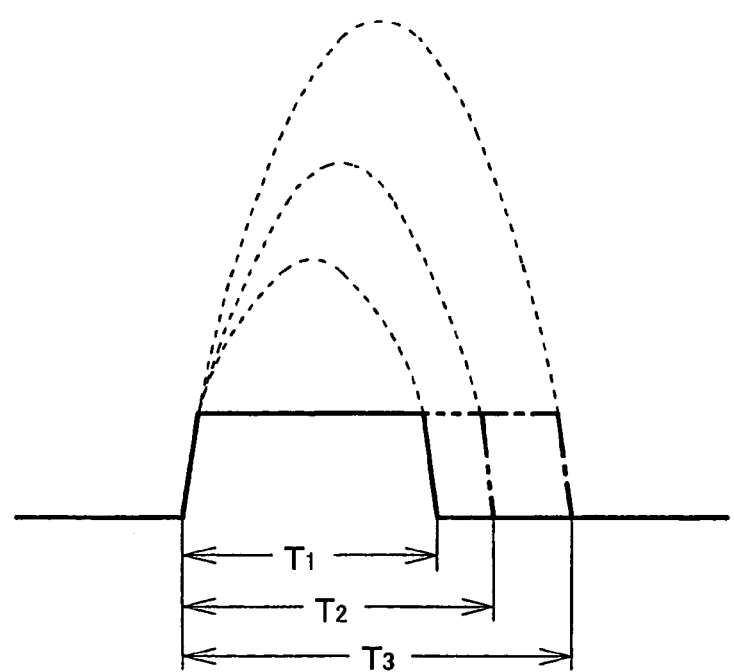
FIG. 3 is a signal diagram of an amplified output signal of a light receiving device in the embodiment.

The pulse width detector circuit 6c detects the pulse width (signal duration period) T of the amplified output signal. As shown in FIG. 3, the pulse width T varies as T1, T2, T3 and the like as the magnitude of the amplified output signal increases. The amplitude of the output signal of the light receiving device 5b increases as the intensity of the received laser light increases. Therefore, the amplified output signal and the detected pulse width T increases as the intensity of the received laser light increases.

A large amplitude of the amplified output signal shown with dotted lines in FIG. 3, however, saturates at a certain level when it reaches the certain level, because the dynamic range of the amplifier circuit 6b is limited. As a result, the intensity of the received laser light cannot be detected when the intensity exceeds the certain level.

The width of the amplified output signal, however, varies with the intensity of the received laser light even when the amplitude of the amplified output signal saturates. Namely, the pulse width T increases as the peak of the amplified output signal increases. Thus, the pulse width indicates the intensity of the received laser light, and is used to regulate the intensity or output power of the laser light radiated from the light emitting device 2. Specifically, the current regulator circuit 6a increases the current supplied to the light emitting device 2 as the detected pulse width decreases, that is, the intensity of the received laser light decreases.

The above object detecting apparatus becomes operable when an automatic cruise control switch provided in a vehicle compartment is turned on.

Specifically, during the vehicle running period, the reflection mirror 3 is motor-driven to a predetermined angle that is set for detecting an object. The light emitting unit 2 radiates the laser light at a predetermined time point ta, and the reflection mirror 3 and the polygon mirror 4 reflects the radiated laser light so that the laser light may be directed forward from the vehicle through the radiation window 1c as shown in the direction A in FIG. 2.

When this laser light is reflected by an object such as a preceding vehicle running ahead, the reflected laser light enters into the case 1 through the light receiving window 1c as shown in the direction B in FIG. 2. This reflected laser light is condensed by the Fresnel lens 5a and received by the light receiving device 5b.

The light receiving device 5b produces the output signal corresponding to the intensity of the received laser light, and the amplifier circuit 6b amplifies the output signal. Thus, not only the presence of an object ahead of the vehicle is detected from the amplified output signal but also the distance (d) to the object is calculated as $d = V \times Td/2$ as a function of the time difference (Td) between the laser light radiation time point and the laser light reception time point using the light travel speed (V).

This calculated distance may be supplied through the connector 1f to an engine control ECU or a brake control ECU (not shown), so that a vehicle engine or a vehicle brake device may be automatically regulated to maintain the desired distance to the preceding vehicle.

During the vehicle stopping period, the output power of the radiated laser light should be lowered to be less than that radiated during the vehicle running condition. At this time, the reflection mirror 3 is similarly motor-driven to the same predetermined angle as set during the vehicle running condition.

In this case, the laser light is radiated from the light radiation unit 2 at a time point tc at which the laser light is reflected and directed by the mirrors 3 and 4 towards the inner wall surface or the Fresnel lens 5a as shown in the direction C in FIG. 2. This laser light is reflected in the direction D and received by the light receiving device 5b, which responsively produces the output signal indicating the intensity of the radiated laser light. With this output signal, the current regulator circuit 6a, the amplifier circuit 6b and the pulse width detector 6c jointly regulate the output power of the laser light to a desired level by executing the above feedback control of the current in correspondence with the detected intensity of the laser light.

Figure 4:
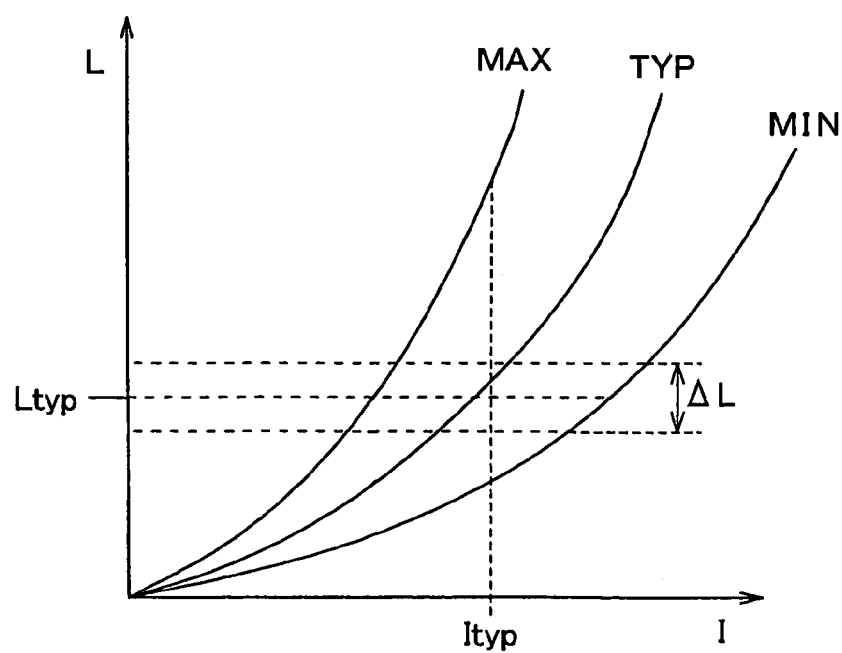
FIG. 4 is a current-power characteristic diagram of a laser diode used in the embodiment.

As shown in FIG. 4, laser diodes normally have differing output powers (L) for currents (I), as exemplified as MAX (maximum output power) and MIN (minimum output power) relative to TYP (typical or normal output power). Even if the current is set to a predetermined level Ityp which will provide a desired output power level Ltyp based on the typical laser diode TYP, the output powers of the other laser diode MAX or MIN will greatly deviates from an allowable variation range ΔL of the desired output power Ltyp. This problem is also obviated by the above feedback control.

It is noted that the desired level of the output power of the laser light is set to a level, which does not cause any damage to human eyes but enables detection of a certain distance to an object. Further, in the vehicle running condition, the above laser light output power level feedback control may be disabled or the desired output power level of the laser light may be set to a higher level so that the object and/or distance detection may cover a sufficiently wide range.

In the above embodiment, the laser light output power level feedback control may be attained in response to a magnitude of the output signal produced by the light receiving device 5b in place of the pulse width detected by the pulse width detector circuit 6c. In this case, the pulse width detector circuit 6c may be replaced with a peak detector circuit, and the gain of the amplifier circuit 6b is preferably set so that the amplified output signal may not saturate so much.

The positional relations among the various component parts in the above embodiment, for instance the sidewise relation between the light receiver unit 5 and the polygon mirror 4, are not limited.

Use of only one light receiving device 5b for both the object/distance detection during the vehicle running and the laser light output power detection in the vehicle stopping condition is advantageous to simplify the apparatus and reduce costs. However, another light receiving device other than the light receiving device 5 may be additionally provided to detect the output power of the radiated laser light for regulating the laser light output power. This light receiving device may be positioned to directly or indirectly receive the radiated laser light when radiated in the direction other than toward the light radiation window 1c.

The present invention should not be limited to the disclosed embodiment, but may be modified in many other ways.

What is claimed is:

1. An object detecting apparatus for detecting an object, the apparatus comprising:
    a case having a light radiating window and a light receiving window;
    a light radiation unit, disposed in the case, for radiating a laser light through the light radiating window;
    a light receiver unit, disposed in the case, for receiving the laser light reflected by an object and entering through the light receiving window;
    control means for detecting an output power of the light radiated from the light radiation unit and feedback-controlling the output power of the laser light to a predetermined level based on a detected output power of the laser light; and
    mirror means, movably disposed in the case, for changing an angle of reflection of the laser light radiated from the light radiation unit, the mirror means being driven to reflect the laser light in the case without being radiated through the light radiating window and received by the light receiver unit without being passed through the light receiving window when a vehicle is in a stopping condition.

2. The object detecting apparatus as in claim 1, wherein the control means includes:
    an amplifier circuit for amplifying an output signal of the light receiver unit; and
    a current regulator circuit for regulating an electric current supplied to the light radiation unit based on an amplified output signal.

3. The object detecting apparatus as in claim 2, wherein the control means further includes:
    a pulse width detector circuit for detecting a pulse width of a pulse signal which corresponds to the amplified output signal, wherein the current regulator circuit regulates the electric current based on a detected pulse width of the pulse signal.

4. The object detecting apparatus as in claim 2, wherein the current regulator circuit regulates the electric current based on a peak magnitude of the amplified output signal.

5. The object detecting apparatus as in claim 1, wherein the control means detects the output power of the laser light radiated from the light radiation unit from an output signal of the light receiver unit which is indicative of the output power of the laser light radiated when the vehicle is in the stopping condition.

6. The object detecting apparatus as in claim 1, wherein an output signal of the light receiver unit is used for feedback-controlling the output power of the light radiation unit while a vehicle is stopping and for detecting the object while the vehicle is running.

* * * * *